(12) United States Patent
Rexberg et al.

(10) Patent No.: US 6,462,704 B2
(45) Date of Patent: Oct. 8, 2002

(54) ARRAY ANTENNA CALIBRATION

(75) Inventors: Leonard Rexberg, Hässelby; Bernt Johansson, Kista, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/773,810

(22) Filed: Jan. 31, 2001

(65) Prior Publication Data
US 2001/0011961 A1 Aug. 9, 2001

(30) Foreign Application Priority Data

Feb. 1, 2000 (SE) .............................................. 0000319

(51) Int. Cl.[7] .................................................. G01S 7/40
(52) U.S. Cl. ....................................... 342/174; 342/372
(58) Field of Search ................................... 342/174, 372

(56) References Cited

U.S. PATENT DOCUMENTS 4,926,186 A * 5/1990 Kelly et al.

FOREIGN PATENT DOCUMENTS

| GB | 2262009 A1 | 6/1993 |
| WO | 97/44920 A1 | 11/1997 |
| WO | 99/57820 A1 | 11/1999 |

* cited by examiner

Primary Examiner—Theodore M. Blum
(74) Attorney, Agent, or Firm—Burns, Doane, Swecker & Mathis, L.L.P.

(57) ABSTRACT

A method and a system for an array antenna calibration are disclosed. The method and system provide a sensor system presenting a sensor device at each antenna element, which sensor devices include digital receivers. Each digital receiver produces a complex base-band I/Q-signal. The outputs of the digital receivers are fed to a Digital Signal Processing device for adding them up to obtain a resulting signal which when converted to a DC signal presents a maximum if all individual signals have the same phase. The search for a maximum of this DC voltage is then used by the Digital Signal Processor for creating source signal phase control signals. By adjusting source signal phases for obtaining maximum added DC voltage derived from the sensor system the phases at the antenna elements will be calibrated. In this manner an adaptive array antenna is simply calibrated even during operation by compensating the base-band I/Q-signals for the intentional phase settings used for achieving a specific channel adaptive array antenna direction.

14 Claims, 6 Drawing Sheets

ARRAY ANTENNA CALIBRATION

This application claims priority under 35 U.S.C. §§ 119 and/or 365 to 0000319-4 filed in Sweden on Feb. 1, 2000; the entire content of which is hereby incorporated by reference.

TECHNICAL FIELD

This invention relates to a method and a system for a relative calibration of the signal path in a radio base station from the point of carrier modulation to the antenna connector and more specifically applies to array antennas used for continuous mobile tracking and for nulling out interference.

BACKGROUND

Today's implementation of calibration is to completely avoid it, or to calibrate only within the radio base station itself. In order to avoid calibration of transmitting paths the usual implementation is to use fixed beam solutions instead. Thereby, only one of the feed cables has to be used for a specific carrier and beam direction. No calibration of neither cables nor any other transmitter part (TX) will be necessary. Beam-forming is then made by preferably placing a Butler matrix nearby the antenna radiators at the top of the mast giving the necessary phase distribution to the elements. Only one port has to be fed to give excitation to all antenna elements using a Butler matrix or anther similar beam-forming network.

The drawback of today's solution is that the feed cables are usually not included in the calibration, but only the components within the base station, if calibration is implemented at all. Fixed beam implementations of array antennas are instead used. This in turn means that nulling out interfering signals from mobiles is not possible, and gain loss is at hand for mobiles located between two beams. Gain loss means that two beams intersect each other at some point (usually −3 dB), which decreases the power that can be transmitted/received. Moreover, mobiles cannot be continuously tracked when they move. Instead the one of the beams which gives the best signal strength is chosen. Also, the overall drawback is less traffic capacity possible and/or speech quality.

Calibration all the way up to the antenna connectors might be implemented by inserting a calibration signal at the appropriate frequency somewhere along the signal path. Or alternatively, the traffic signal itself might be used for the calibration. Then signal would be fed back again down to the base station by either extra RF cables (as many as antenna feed cables) or by shifting the frequency to receive frequency band and reading the signals using the ordinary receivers in the base stations.

An international application WO97/44920 discloses an array antenna, which performs self-calibration by providing weighting factors for the adaptive array of antenna elements by modulating a narrow band channel with a relatively broadband signal containing a test sequence. In this way an overlaid channel is produced which is picked up and carried back through a complimentary one of the reception or transmission paths to thereafter be converted to base-band and compared with the test sequence for detecting and correcting possible errors.

The problem with the aforementioned method is that it occupies at least one channel in receive or transmit path and possibly also requires additional RF cables up-and-down the antenna mast just for calibration. Moreover, the transmission down to the base station also needs calibration for the RF frequency at use. This all makes it a very complicated method to calibrate antenna arrays using this method.

A need therefore exists for an improved array antenna calibration method and system which in an effective and simple way will be able to provide an optimal operation of a base station array antenna.

SUMMARY

The present disclosure describes a simple way to perform phase calibration, which needs only a limited set of additional hardware, and can be used under on-going traffic conditions. The proposed method in this disclosure makes it possible to implement calibration without substantial additional complexity to the base station system. Moreover, also antenna feed cables may be calibrated. For the calibration additional RF cables are not necessary.

A method and a system for an array antenna calibration are disclosed. The method and system provide a sensor system, localized close to the antenna elements, presenting a sensor for each antenna element, whereby the sensors constitute simple digital receivers and produce complex base-band signals. The outputs of the sensor system digital receivers are interconnected for vector-adding the outputted base-band signals to produce a summed DC voltage. The acquired summed DC voltage is via a device, for instance a Digital Signal Processing cluster, controlled by adjusting the phases of each antenna element source signal and by searching for a maximum summed DC voltage from the sensor system, whereby the individual signal paths of the array antenna will be calibrated. Normally when a calibration is performed, the antenna beam would need to always steer in the broadside direction. To facilitate calibration during normal operation regardless of intended phase settings, intended offset phases are accounted for in the calibration process. These offset phases provided for changing the beam direction of the adaptive array antenna are supplied to the summing step to incorporate those offsets into the calibration algorithm.

A method for calibration of an array antenna according to the present invention is set forth by the independent claim 1 and the dependent claims 2–7 and a system for calibration of an array antenna is set forth by the independent claim 8 and further embodiments of the system are set forth by the dependent claims 9–14.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
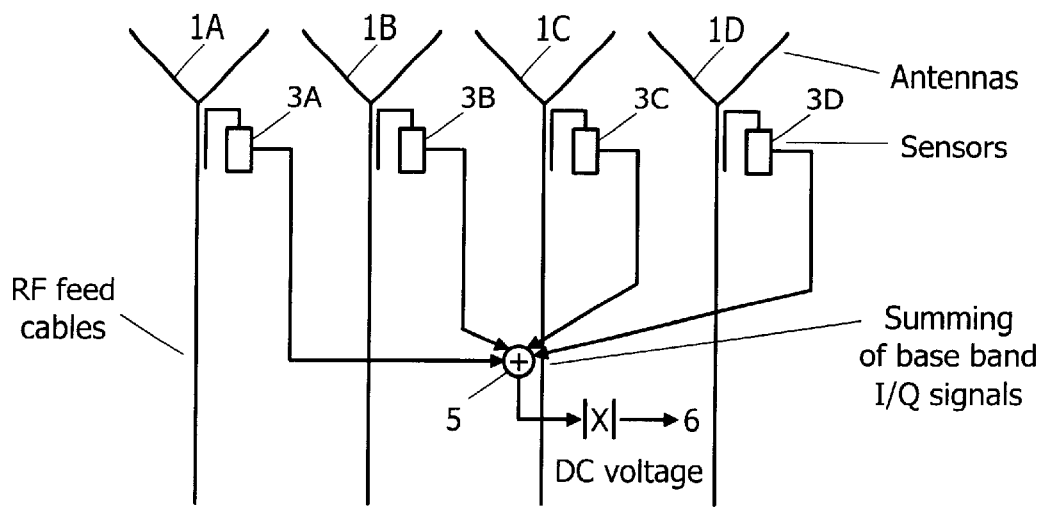
FIG. 1 presents a general embodiment illustrating four antennas provided with signal sensors and comprising antenna feed cables, antenna elements, digital signal processing and a low voltage transmission cable.
Figure 2:
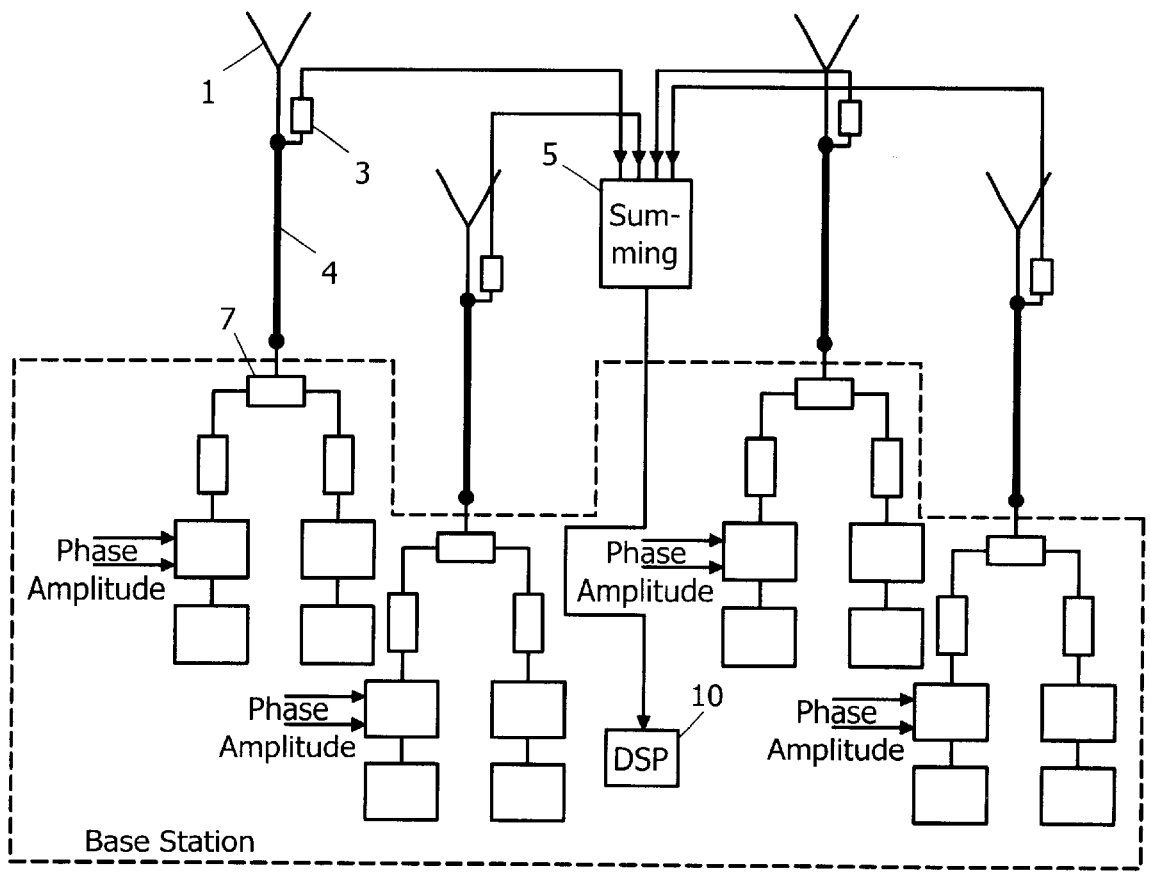
FIG. 2 illustrates schematics of an illustrative base station with a 4-element array antenna, wherein signals are picked up at antenna connector level, down-converted to base-band and vector-added to produce a DC voltage.
Figure 3:
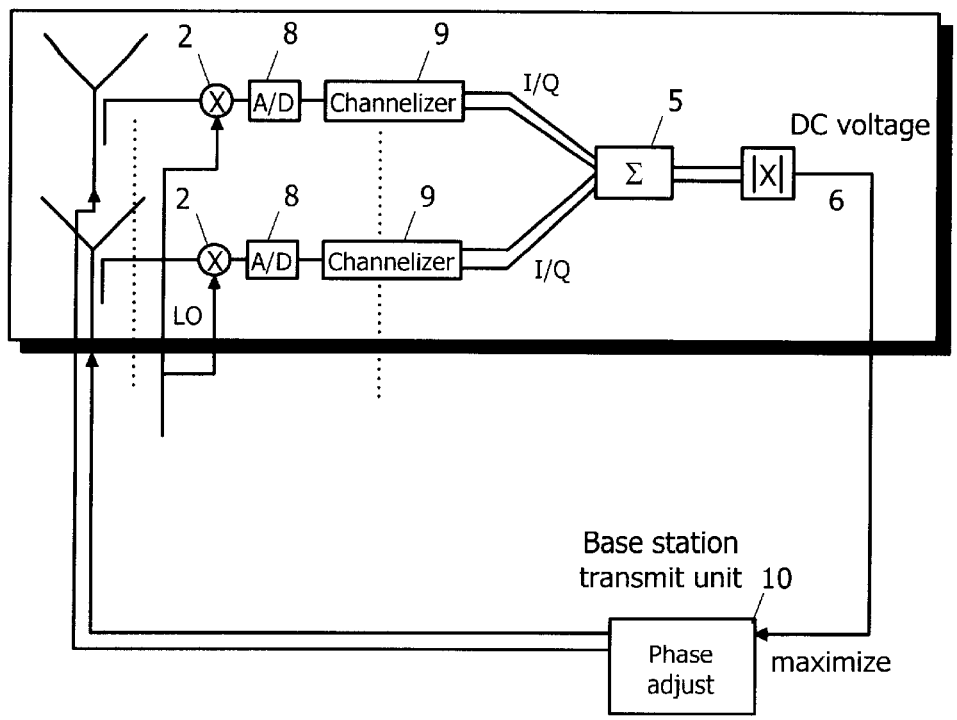
FIG. 3 illustrates down-conversion, A/D conversion, channelizing and summation of complex signals to form DC voltage.
Figure 4:
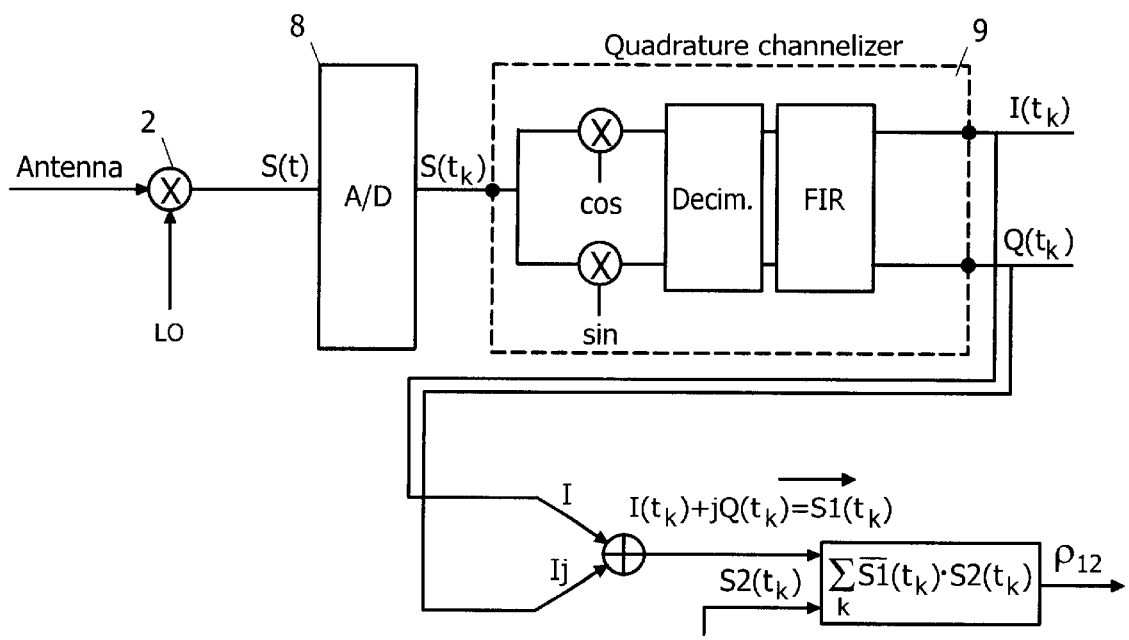
FIG. 4 illustrates by means of a block diagram signal processing in the calibration sensor of the illustrative embodiment of FIG. 1 to obtain a complex DC voltage from a RF signal.

The solution to the above problem is to place sensors 3 at each antenna element feed/connector at the top of the mast and then make the necessary computations at the position where the sensors are localized (FIG. 1). All acquired signals may then be combined to give maximum DC voltage by adjustment of the phases, for example, at base-band. That is, the proposition is to use simple digital receivers forming as many branches as the number of antenna elements (see FIG. 2), whereby signals are picked up at the antenna connector level, down-converted to base-band and vector-added 5 to produce a DC voltage 6, which is fed to the base station Digital Signal Processor cluster 10 (DSP) to adjust phases for a maximum DC voltage from the sensor system;

The performance of this receiver may be rather limited compared to an ordinary traffic channel receiver. Since there is no need to fulfil any requirement associated with a communication standard, simple digital components can be used, i.e. for instance 8 bit A/D converters 8 instead of 14 bit A/D converters, which will normally be necessary for fulfilling the standard for a base station receiver. (Also see FIG. 3 and FIG. 4).

The basic idea is then to use a resulting complex base-band signal (In-phase/Quadrature-phase detector signal, I/Q) from each receiver branch and make calculations directly at the location of the sensor devices. Alternatively, since the signals no longer are RF signals, the signals might be transferred to another appropriate location in a multiplexed way using a single low voltage transmission cable. In either case, the signal is converted to base-band at the location of the sensor device so that RF transmission is avoided.

The calculations are performed on the base-band complex I/Q-signals. Adding those up will give a resulting new complex signal. This signal 6 will have maximum amplitude if all the individual signals all have the same phase. That is, we have found a way to calibrate all the antenna branches by just adjusting the phases at the signal source level, until the resulting amplitude of the summed total base-band signal reaches maximum. The actual algorithm for the adjustment may be of several types, ranging from random search to an automatic Newton-Raphson type of maximization method.

Signal Processing

Figure 5:
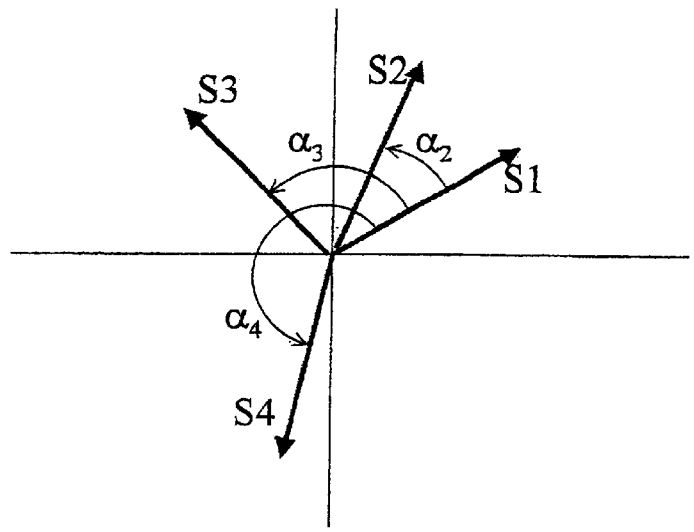
FIG. 5 illustrates a signal representation of 4 complex signals, $\alpha_2$-$\alpha_4$ denote phase errors between antenna signals in the signal path from generator to antenna connector.
Figure 6:
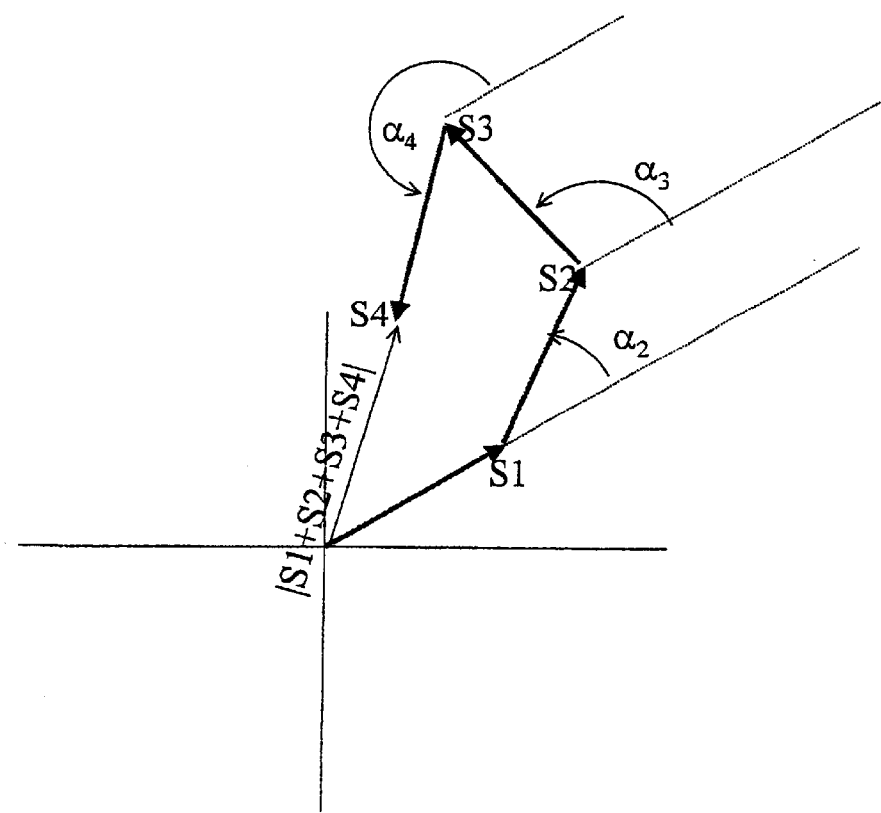
FIG. 6 illustrates same picture as in FIG. 5, but the signals are repositioned for easier visualization of the vector addition.
Figure 7:
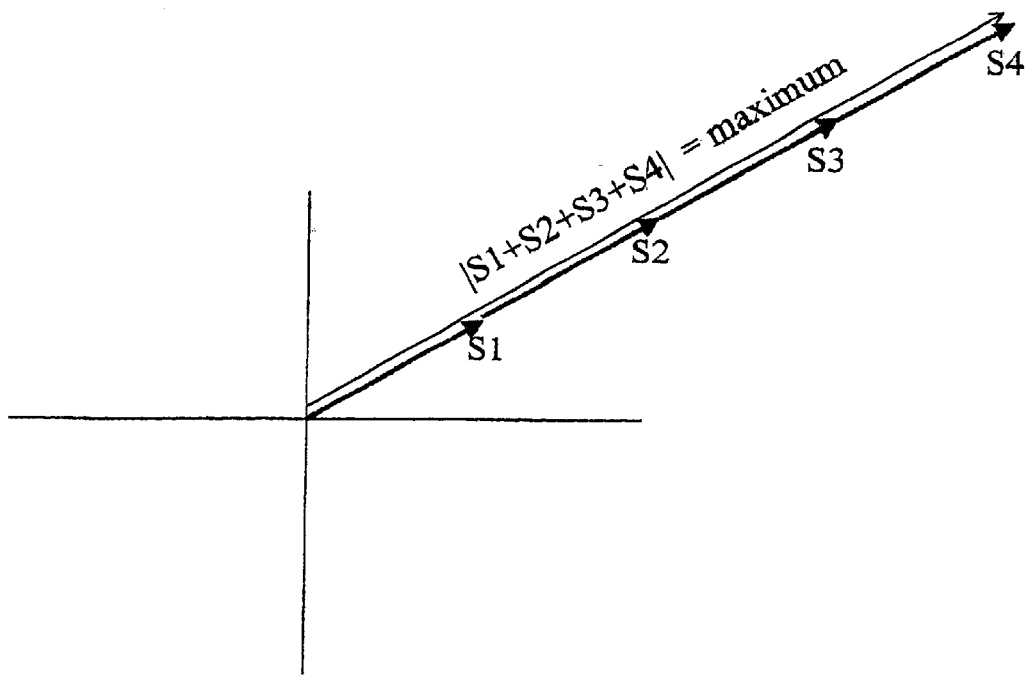
FIG. 7 illustrates according to the present invention the complex signal vectors being aligned without phase errors to give maximum amplitude when summed up.

The signal processing can be regarded as adding up a number of signal vectors in the complex signal plane (FIG. 5 and FIG. 6), in such a way that the sum of those describes a signal vector that has maximum amplitude (FIG. 7). The search routine for this may be of any appropriate type. One example is Newton-Raphson. It should be noted that this algorithm applies to any periodic signal and is not restricted to just a pure sinusoidal signal. To highlight the algorithm, consider the following outline. Assume that we have a phase or frequency modulated signal transmitted from the base station. The signal can be mathematically illustrated by the following expression:

$$S(t) = A \cdot \cos(\omega \cdot t + m(t))$$

Say that we are further dealing with four antenna branches in the array antenna. Then, due to irregularities there will be phase errors ($\alpha_2$-$\alpha_4$) developing in the signal paths according to (we assume $\alpha_1 = 0$):

$$
\begin{aligned}
I_1(t) &= A \cdot \cos(\omega \cdot t + m(t)) & Q_1(t) &= A \cdot \sin(\omega \cdot t + m(t)) \\
I_2(t) &= A \cdot \cos(\omega \cdot t + m(t) + \alpha_2) & Q_2(t) &= A \cdot \sin(\omega \cdot t + m(t) + \alpha_2) \\
I_3(t) &= A \cdot \cos(\omega \cdot t + m(t) + \alpha_3) & Q_3(t) &= A \cdot \sin(\omega \cdot t + m(t) + \alpha_3) \\
I_4(t) &= A \cdot \cos(\omega \cdot t + m(t) + \alpha_4) & Q_4(t) &= A \cdot \sin(\omega \cdot t + m(t) + \alpha_4)
\end{aligned}
$$

wherein $I_n(t)$ is the in-phase component of the signal and $Q_n(t)$ is the quadrature-phase component of antenna number n.

The signal amplitude A is noted but for convenience it is regarded to be the same in all antenna branches. It is evident that combining these two I/Q expressions into a complex signal $I(x) + jQ(x)$ we obtain the following complex signals instead, which are more handy for calculations:

$$
\begin{aligned}
S_1(t) &= I_1(t) + j \cdot Q_1(t) = A e^{j \cdot (\omega t + m(t))} \\
S_2(t) &= I_2(t) + j \cdot Q_2(t) = A e^{j \cdot (\omega t + m(t) + \alpha_2)} \\
S_3(t) &= I_3(t) + j \cdot Q_3(t) = A e^{j \cdot (\omega t + m(t) + \alpha_3)} \\
S_4(t) &= I_4(t) + j \cdot Q_4(t) = A e^{j \cdot (\omega t + m(t) + \alpha_4)}
\end{aligned}
$$

We now observe that in order to assert only the phase contribution we merely have to filter out the time-dependence of the carrier and the message. This can be done by a cross-wise signal multiplication known as signal correlation (FIG. 7). In this process one of the signals is used as complex-conjugated. The result is as described below:

$$
\begin{aligned}
\overline{S}_1(t) \cdot S_1(t) &= \rho_{11} = (|A|)^2 \\
\overline{S}_1(t) \cdot S_2(t) &= \rho_{12} = (|A|)^2 \cdot e^{j \cdot \alpha_2} \\
\overline{S}_1(t) \cdot S_3(t) &= \rho_{13} = (|A|)^2 \cdot e^{j \cdot \alpha_3} \\
\overline{S}_1(t) \cdot S_4(t) &= \rho_{14} = (|A|)^2 \cdot e^{j \cdot \alpha_4}
\end{aligned}
$$

We see that the time-dependence is clearly filtered out in the above results. In reality to decrease influence of inaccuracies and noise, it is a better idea to sum up contributions over a longer time period. This introduces a certain averaging effect to the correlation process. Therefore we may instead write:

$$\sum \overline{S}_1(t_k) \cdot S_1(t) = \rho_{11} = (|A|)^2$$

$$\sum \overline{S}_1(t_k) \cdot S_2(t) = \rho_{12} = (|A|)^2 \cdot e^{j \cdot \alpha_2}$$

$$\sum \overline{S}_1(t_k) \cdot S_3(t) = \rho_{13} = (|A|)^2 \cdot e^{j \cdot \alpha_3}$$

$$\sum \overline{S}_1(t_k) \cdot S_4(t) = \rho_{14} = (|A|)^2 \cdot e^{j \cdot \alpha_4}$$

Now, by adding up all the ρ-factors and at the same time normalizing by $\rho_{11}$, we have arrived at a DC voltage that will be maximum if all the array antenna signals are in phase (Also see FIG. 6).

$$\left| \frac{\rho_{11}}{\rho_{11}} + \frac{\rho_{12}}{\rho_{11}} + \frac{\rho_{13}}{\rho_{11}} + \frac{\rho_{14}}{\rho_{11}} \right| = \frac{1}{|\rho_{11}|} \cdot |\rho_{11} + \rho_{12} + \rho_{13} + \rho_{14}| = V_{DC}$$

It should be noted that local maxima of the above function might occur. This is the reason for normalizing with $\rho_{11}$, thus giving a certain control over the algorithm. Normalizing means that the value of the sum should be maximized at a value equal to the number of antenna branches (n). For example, using four antenna branches the $V_{DC}$ should approach the value of 4.

It is evident that when the array is given an appropriate phase distribution to form a beam in a given direction, the summed-up complex base-band signals will not give maximum DC voltage. Normally when a calibration is performed, the antenna beam would need to always steer in the broadside direction. To facilitate calibration during normal operation regardless of intended phase settings, intended offset phases should be accounted for in the calibration process. Then the offset phases provided for changing the beam direction of the adaptive array antenna are supplied to the summing step to incorporate them into the calibration algorithm.

These intentional phases $\beta_1$–$\beta_4$ may be incorporated into the previous equation, which then will be modified to:

$$\left| \frac{\rho_{11}}{\rho_{11}} \cdot e^{j\beta_1} + \frac{\rho_{12}}{\rho_{11}} \cdot e^{j\beta_2} + \frac{\rho_{13}}{\rho_{11}} \cdot e^{j\beta_3} + \frac{\rho_{14}}{\rho_{11}} \cdot e^{j\beta_4} \right| =$$

$$\frac{1}{|\rho_{11}|} \cdot |\rho_{11} \cdot e^{j\beta_1} + \rho_{12} \cdot e^{j\beta_2} + \rho_{13} \cdot e^{j\beta_3} + \rho_{14} \cdot e^{j\beta_4}| = V_{DC}$$

The phases $\beta_1$–$\beta_4$ then compensate for intentional phase settings for the direction of a specific channel so that the same algorithm can be used to calibrate the array antenna under ongoing traffic.

Figure 10:
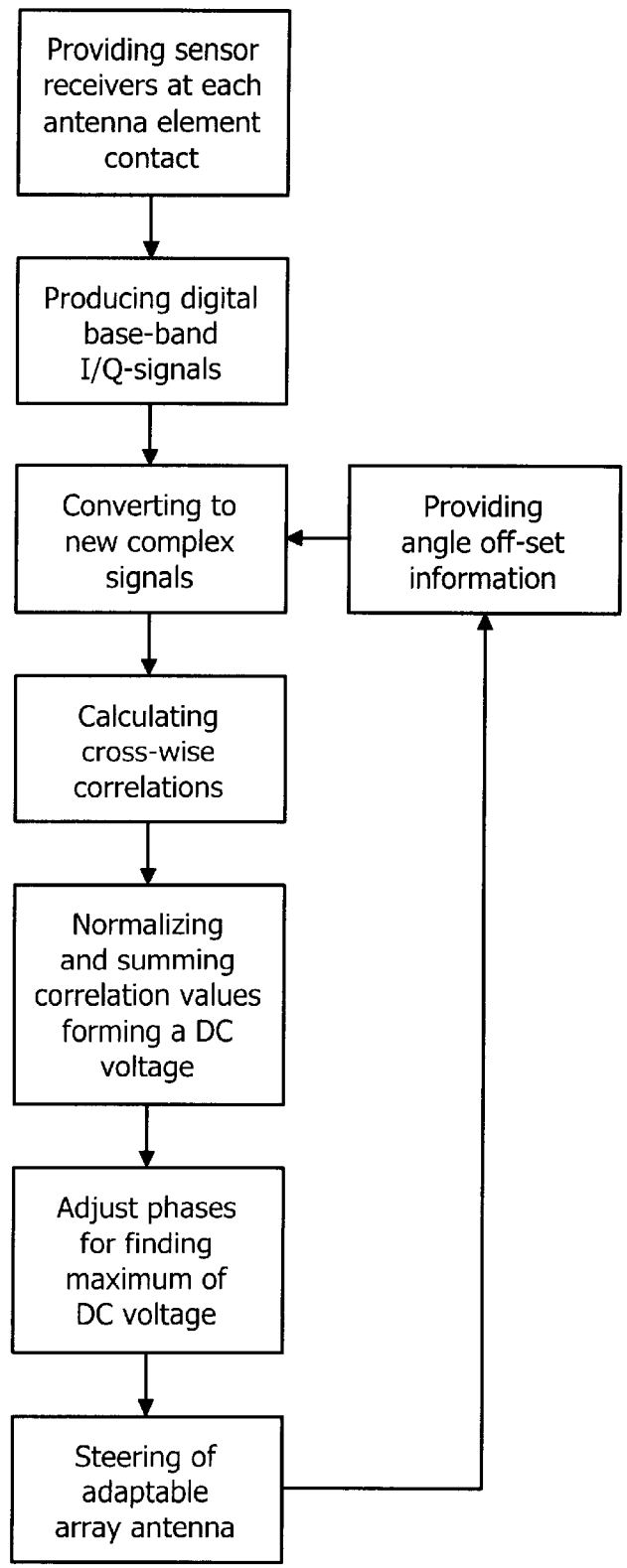
FIG. 10 is a basic flow diagram illustrating the main steps of the present method for array antenna calibration.

In FIG. 10 a basic flow diagram of the present method is indicated and the information of the intended offset phases $\beta_1$–$\beta_4$ are then provided to the step of vector-adding the base-band signals as these offset angles have to be compensated for by vector subtracting those when obtaining the calibration DC voltage.

Amplitude Calibration

Figure 8:
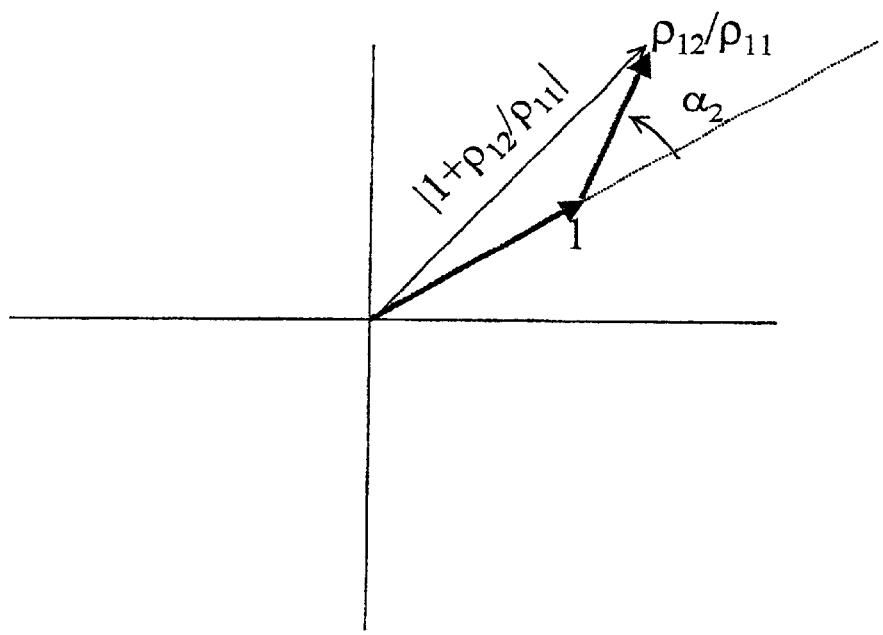
FIG. 8 illustrates a phase calibration in a two-by-two calibration wherein two signals in the complex plane are aligned to give maximum total amplitude and a maximum amplitude will be $V_0 = 1 + |\rho_{12}/\rho_{11}|$.

If there is a too big difference also in the amplitude of the branches, then it is more uncertain what value the maximum value of $V_{DC}$ should converge to. However, the algorithm as described in this document is also applicable to the amplitude if signals are used in pairs of two. In this case the phase of one of the signals is first adjusted until a maximum $V_{DC}$ is obtained as describes by Step 1 below (FIG. 8). Then the amplitude of the same signal is adjusted until instead $V_{DC}$ reaches the value of 2, as described by Step 2 below (FIG. 8). The calibration is made for the pair of two signals using only a DC voltage as observation signal. No additional local maxima exist for summing 2 vectors, so only one solution exists for the pair of signals. The algorithm is repeated with the next pair of signals until all of the signal branches are calibrated.

Step 1: Phase calibration of two signals (See FIG. 8)

$$\rho_{11} = \overline{S}_1 \cdot S_1$$

$$\rho_{12} = \overline{S}_2 \cdot S_1$$

$$V I_{DC}(\alpha) = \left| 1 + \frac{\rho_{12} \cdot e^{-j\alpha}}{\rho_{11}} \right|$$

$$\alpha = \text{Maximize}(V I_{DC}, \alpha)$$

Figure 9:
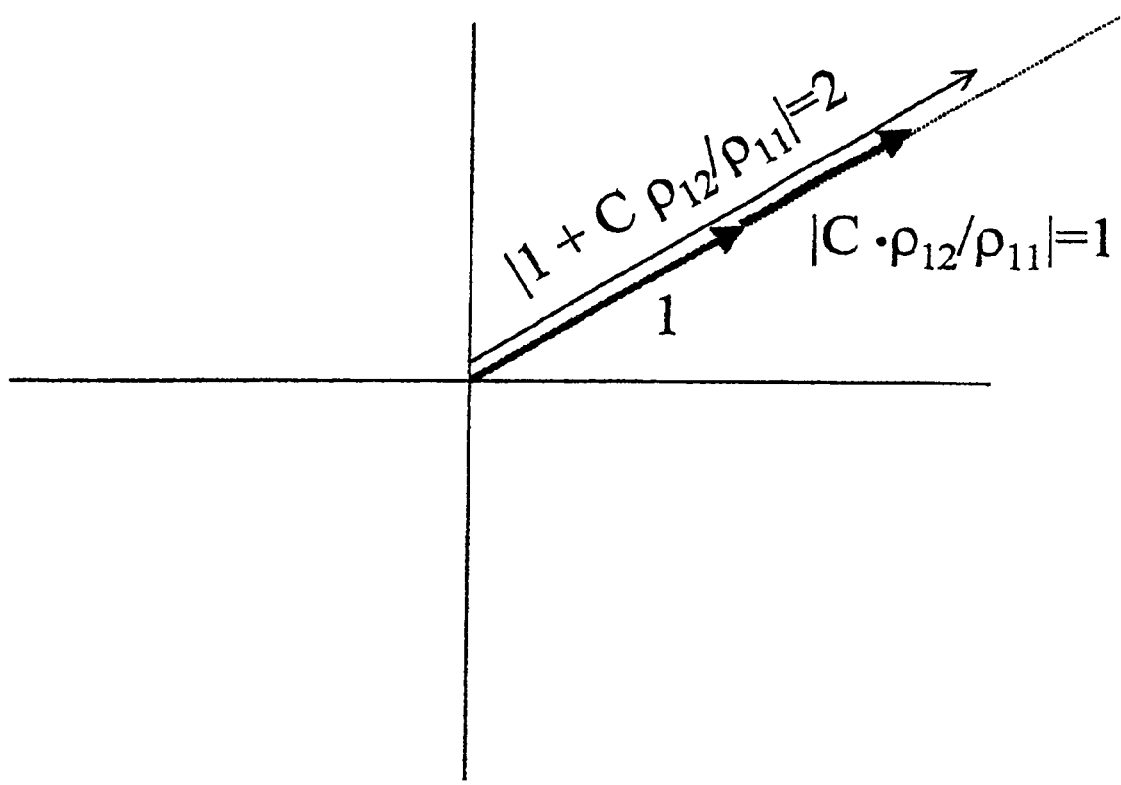
FIG. 9 illustrates an amplitude calibration in the two-by-two calibration, wherein two signals in the complex plane are amplitude adjusted to give maximum total amplitude and an amplitude adjustment will be $$C = |\rho_{11}/\rho_{12}| = (V_0 - 1)^{-1}; \text{ and}$$

Step 2: Amplitude calibration of two signals (See FIG. 9)

$$V I_{DC}(C) = \left| 1 + \frac{C \cdot \rho_{12} \cdot e^{-j\alpha}}{\rho_{11}} \right| = 2$$

$$C = \text{Find}(C)$$

From maximum $V1_{DC}$ measured in Step 1, we find $C = |\rho_{11}/\rho_{12}| = (V1_{DC} - 1)^{-1}$ in Step 2.

Hardware

The hardware solution can be implemented by using ordinary digital components to define the sensor-soft-radio. This comprises down-mixing 2, analog-digital conversion 8 and a quadrature demodulator 9 as described by FIG. 4. The signal is down-converted (LO), digitized (A/D), to obtain a complex base band signal (I/Q), for instance, by means of quadrature detection, decimated to a lower sampling frequency and filtered for instance utilizing a decimating FIR-filter. This typical technique is well known by persons skilled in the art. Signal processing for correlation to other antenna signals is for instance made by means of a standard Digital Signal Processor 10.

Unlike in a soft-radio for cellular applications, it is not necessary to use high performance digital components for the calibration algorithm to function. Neither it will be critical to use a high sampling rate. In an illustrative embodiment a resolution of 8 bits is used for the A/D conversion 8 of sensor signals. However today easily accessible A/D converters having other resolutions may of course be utilized. Moreover, the calibration can be performed on a channel-by-channel basis and performed under normal traffic. The implementation in the form of a soft-radio further reduces the risk for the sensor itself to be uncalibrated.

Discussions

The proposed solution provides a simple way to adjust for phase errors at any point in the signal path all the way from base-band signal source to the top of the antenna mast. The measured figure is plain DC voltage, which is traced and forced to become a maximum value. The DC voltage can easily be fed back to the transmit unit using the same feed cable as the one used for RF transmission.

The proposed solution may be implemented as a separate process that can be executed independently of ongoing traffic. The solution can be implemented as a slow feedback loop for monitoring and adjustment of differences in the signal paths. It can be used to compensate for slow temperature drift as well as for deterministic differences in hardware manufacturing. The solution does not affect the system performance.

With phase calibration as described in this disclosure, continuous tracking of mobiles may be performed. Moreover, unwanted signals may be effectively nulled out at a precise angle towards the mobile in an adaptive array application.

It is understood that the proposed system and the calibration method constitute a way to calibrate the hardware on a channel by channel basis. That is a table entry may be calculated to give best calibration for each frequency channel individually. The proposed system and the calibration method provide a low cost alternative to calibrate an array antenna. Low cost digital components with a low resolution can be used for the purpose and the system according to the invention needs a minimum of extra hardware.

It will be understood by those skilled in the art that various modifications and changes may be made to the present invention without departure from the scope thereof, which is defined by the appended claims.

What is claimed is:

1. A method for an array antenna calibration comprising the steps of providing a sensor system presenting a sensor device at each antenna element, said sensor devices including digital receivers and each digital receiver producing a respective complex base-band I/Q-signal;

providing present beam pointing angle signal phase off-set information and converting base band I/Q-signals into new complex signals corresponding to a broad-side beam direction;

producing crosswise signal correlation values from acquired new complex signals by a digital processing device for filtering out time dependent portions of said complex signals;

normalizing and adding achieved signal correlation values to arrive at a summed DC voltage that will present a maximum when all sensed antenna element signals corresponding to a broad-side direction are in phase;

adjusting signal phase of each antenna element source signal by a device for controlling signal phase in order to obtain maximum summed DC voltage achieved from the sensor system base band signals.

2. The method according to claim 1, comprising the further step of localizing said sensor device to pick up antenna element signals at an antenna contact level.

3. The method according to claim 1, comprising the further step of using 8 bit A/D converters in said simple digital receivers forming said sensor system for acquiring digital base-band I/Q-signals.

4. The method according to claim 1, comprising the further step of transferring acquired complex signals for further processing to a processing device in the base station using a same feed cable as for RF transmission to an antenna element making extra cables unnecessary.

5. The method according to claim 1, comprising the further step of using a base station Digital Signal Processor cluster as processing device for calculating signal correlation values when forming said summed DC voltage to be maximized and as the device for controlling the phase of the array antenna source signals for maximizing obtained DC voltage.

6. The method according to claim 1, comprising the further step of applying a Newton-Raphson search algorithm for finding a maximum of the obtained DC voltage when adjusting signal phase of each antenna element source signal.

7. The method according to claim 1, comprising the further step of performing an initial adjustment of the antenna element source signals if having too large amplitude differences in antenna signal branches, by using only paired signals from the sensor system and adjusting the phase of one of the corresponding two source signals for a resulting maximum DC voltage derived from two base-band sensor signals to a value of twice the value of that for a single sensor and repeating this for all available pairs of signals until all of the signal branches has been calibrated in this way.

8. A system for an array antenna calibration comprising a sensor system presenting a local sensor device at each antenna element, the sensor devices including digital receivers, each digital receiver producing a complex base-band I/Q-signals, acheived complex base-band I/Q-signals being converted into new complex signals corresponding to a broad-side beam direction by compensating for present beam pointing angle off-set;

a digital processing device for producing crosswise signal correlation values from acquired new complex signals for filtering out time dependent components of the acquired new complex signals, the obtained correlation values being normalized and summed to arrive at a summed DC voltage, which will present a maximum value when all sensed antenna element signals corresponding to a broad-side direction are properly phased, and a control means for obtaining a maximum summed DC voltage by adjusting the phase of each antenna element source signal to thereby obtain a predetermined array antenna system signal phasing.

9. The system according to claim 8, wherein each sensor device for picking up antenna element signals is localized at an antenna contact level.

10. The system according to claim 8, wherein 8 bit A/D converters are utilized in the simple digital receivers forming the sensor system for acquiring digital base-band I/Q-signals.

11. The system according to claim 8, wherein acquired digital complex signals are transferred to a processing means in the base station using a corresponding feed cable as for RF transmission to an antenna element which makes extra cables unnecessary.

12. The system according to claim 8, wherein a base station Digital Signal Processor cluster is used as processing means for calculating signal correlation values and as a device for controlling the phase of the array antenna source signals.

13. The system according to claim 8, wherein a Newton-Raphson search algorithm is applied for finding a maximum value of the summed DC voltage when adjusting signal phases of each antenna element source signal.

14. The system according to claim 8, wherein an initial adjustment of antenna branches is performed, when having large signal differences in the antenna signal branches, by using only paired signals from the sensor system and adjusting the phase of one of the corresponding two source signals for a resulting maximum DC voltage derived from two base-band sensor signals to a value of twice the value of that for a single sensor, whereby this is repeated for all available pairs of signals until all of the signal branches has been calibrated in this way.

* * * * *